(12) United States Patent
Ueno

(10) Patent No.: US 12,499,783 B2
(45) Date of Patent: Dec. 16, 2025

(54) LAMINATED BODY, HEAT-SENSITIVE LABEL, IN-MOLD LABEL AND LABELED CONTAINER

(71) Applicant: YUPO CORPORATION, Tokyo (JP)

(72) Inventor: Masahiko Ueno, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 70 days.

(21) Appl. No.: 18/685,329

(22) PCT Filed: Aug. 23, 2022

(86) PCT No.: PCT/JP2022/031710
§ 371 (c)(1),
(2) Date: Feb. 21, 2024

(87) PCT Pub. No.: WO2023/027067
PCT Pub. Date: Mar. 2, 2023

(65) Prior Publication Data
US 2025/0006082 A1 Jan. 2, 2025

(30) Foreign Application Priority Data
Aug. 27, 2021 (JP) ................. 2021-138691

(51) Int. Cl.
*G09F 3/02* (2006.01)
*G09F 3/10* (2006.01)

(52) U.S. Cl.
CPC .............. *G09F 3/02* (2013.01); *G09F 3/10* (2013.01); *G09F 2003/023* (2013.01); *G09F 2003/0272* (2013.01)

(58) Field of Classification Search
CPC ..... G09F 3/02; G09F 3/10; G09F 3/04; G09F 2003/023; G09F 2003/0272;
(Continued)

(56) References Cited

U.S. PATENT DOCUMENTS

| 2008/0118718 A1 | 5/2008 | Koike et al. |
| 2021/0394495 A1 | 12/2021 | Honda et al. |
| 2023/0121482 A1 | 4/2023 | Ueno et al. |

FOREIGN PATENT DOCUMENTS

| JP | 07-244462 A | 9/1995 |
| JP | 11-085034 A | 3/1999 |

(Continued)

OTHER PUBLICATIONS

WO201193861-A1 Machine Translation of equivalent JP7289011 (Year: 2021).*

(Continued)

*Primary Examiner* — Laura C Powers
(74) *Attorney, Agent, or Firm* — GREENBLUM & BERNSTEIN, P.L.C.

(57) ABSTRACT

Provided is a laminated body that has sufficient adhesive strength to an adherend and that is easy to peel off by high temperature water treatment. The laminated body has a substrate layer and a heat sealing layer (A). The heat sealing layer (A) is the outermost layer of the laminated body. The heat sealing layer (A) contains a heat sealing resin (a) and a water-soluble resin (c), and the mass ratio of the heat sealing resin (a) to the water-soluble resin (c) in the heat sealing layer (A) is 70:30 to 45:55.

9 Claims, 1 Drawing Sheet

(58) Field of Classification Search
CPC ... G09F 2003/0222; B65D 1/02; B65D 23/08; B65D 2203/02; B65D 1/00; B65D 23/00; B65D 25/20
See application file for complete search history.

(56) References Cited

FOREIGN PATENT DOCUMENTS

| | | | |
|---|---|---|---|
| JP | 2011-118102 A | 6/2011 | |
| WO | 2006/054725 A1 | 5/2006 | |
| WO | 2020/067327 A1 | 4/2020 | |
| WO | 2021/193852 A1 | 9/2021 | |
| WO | WO-2021193861 A1 * | 9/2021 | ............. B29C 49/24 |

OTHER PUBLICATIONS

ISR issued in International Patent Application No. PCT/JP2022/031710, Nov. 22, 2022, English translation.
IPRP issued in International Patent Application No. PCT/JP2022/031710, dated Feb. 27, 2024, translation.

* cited by examiner

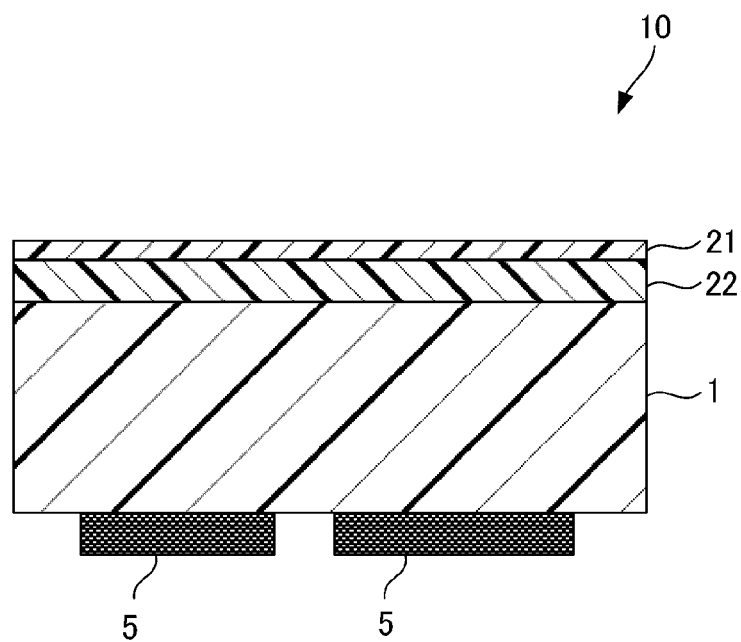

LAMINATED BODY, HEAT-SENSITIVE LABEL, IN-MOLD LABEL AND LABELED CONTAINER

TECHNICAL FIELD

The present invention relates to a laminated body, a heat-sensitive label, an in-mold label, and a labeled container.

BACKGROUND ART

Conventionally, a resin container has been used as a container for drinking water, a cosmetic, a seasoning, or the like. A wasted resin container is being recycled as a new resource in order to reduce the burden on the environment due to the mass consumption of a commercial product.

A label is often attached to a resin container, and thus the treatment of removing the label from the resin container is carried out when the resin container is recycled. For example, in the recycling of a PET bottle, a used PET bottle is cut into small pieces, and then the treatment of immersing these in high temperature alkali water (a 1.5% NaOH aqueous solution) at about 85 to 90° C. is carried out in order to peel off the label. A label that can be easily peeled off by this high temperature alkali water has been developed (see, for example, Patent Literature 1).

CITATION LIST

Patent Literature

Patent Literature 1: Japanese Patent Laid-Open No. 2011-118102

SUMMARY OF INVENTION

Technical Problem

When high temperature alkali water is used, neutralization treatment is required afterward, and regulations on the use of high temperature alkali water may be strict depending on the country. Because of this, high temperature water, which is easier in process control than high temperature alkali water, is also often used for label removal. Therefore, there is a need for a label that is easy to peel off when treated with high temperature water. However, the label is also required to have sufficient adhesion strength to a resin container so that the label is not peeled off from the resin container in a normal use condition, and thus it has been difficult to achieve the both at the same time.

An object of the present invention is to provide a laminated body that has sufficient adhesive strength to an adherend such as a resin container and that is easy to peel off by high temperature water treatment.

Solution to Problem

As a result of diligent studies by the present inventors to solve the above problem, the present inventors have found that the above problem can be solved if a heat sealing layer to be adhered to an adherend contains a heat sealing resin and a water-soluble resin at a specific mass ratio, and completed the present invention.

That is, the present invention is as follows.

[1] A laminated body comprising a substrate layer and a heat sealing layer (A), wherein
the heat sealing layer (A) is an outermost layer of the laminated body,
the heat sealing layer (A) comprises a heat sealing resin (a) and a water-soluble resin (c), and
a mass ratio of the heat sealing resin (a) to the water-soluble resin (c) in the heat sealing layer (A) is 70:30 to 45:55.

[2] The laminated body according to [1], wherein
the heat sealing resin (a) is an olefin-based resin having a melting point of 50 to 115° C.

[3] The laminated body according to [1] or [2] above, wherein
the water-soluble resin (c) is a (meth)acrylic acid-based copolymer having a cationic group.

[4] The laminated body according to any one of [1] to [3] above, wherein
the laminated body comprises a heat sealing layer (B) between the substrate layer and the heat sealing layer (A).

[5] The laminated body according to [4] above, wherein
the heat sealing layer (B) comprises a heat sealing resin (b), and
the heat sealing resin (b) is an olefin-based resin having a melting point of 50 to 115° C.

[6] The laminated body according to any one of [1] to [5] above, wherein
the laminated body comprises a printed layer on a surface of the substrate layer opposite to the heat sealing layer (A).

[7] A heat-sensitive label comprising the laminated body according to any one of [1] to [6] above.

[8] An in-mold label comprising the heat-sensitive label according to [7] above.

[9] A labeled container, comprising the in-mold label according to [8] above adhered to an outer surface of a resin container via the heat sealing layer (A).

[10] The labeled container according to [9] above, wherein
the resin container comprises an ester-based resin.

Advantageous Effect of Invention

According to the present invention, it is possible to provide a laminated body that has sufficient adhesive strength to an adherend and that is easy to peel off by high temperature water treatment.

BRIEF DESCRIPTION OF DRAWING

FIG. 1 is a sectional view showing an example of a laminated body.

DESCRIPTION OF EMBODIMENTS

Hereinafter, the laminated body, the heat-sensitive label, the in-mold label, and the labeled container according to the present invention will be described. The following description is an example (representative example) of the present invention, and the present invention is not limited thereto.

In the following description, the description "(meth) acrylic" refers to both acrylic and methacrylic.

[Laminated Body]

The laminated body of the present invention has a substrate layer and a heat sealing layer (A). In the present invention, the heat sealing layer (A) is the outermost layer of the laminated body and contains a heat sealing resin (a) and a water-soluble resin (c) at a specific mass ratio of 70:30 to 45:55.

The laminated body of the present invention can be adhered to an adherend via the heat sealing layer (A), and can be preferably used as, for example, a heat-sensitive label, particularly an in-mold label. When used as an in-mold label, the laminated body is disposed in a mold for molding a resin container and adhered to the outer surface of the resin container via the heat sealing layer (A) melted by the heat during molding.

Usually, an in-mold label is attached such that it is integrated with the resin container, and thus it is difficult to remove the label. However, when the laminated body of the present invention is subjected to the treatment of immersion in high temperature water at 75 to 80° C. for a certain period of time (hereinafter referred to as high temperature water treatment), the water-soluble resin (c) in the heat sealing layer (A) dissolves in high temperature water. The heat sealing layer (A) is destroyed by the dissolution, and thus the label is easy to peel off from the resin container. Therefore, the label can be easily peeled off from the labeled container by high temperature water treatment, and the recyclability of the resin container is enhanced. No high temperature alkali water is used, and thus no neutralization treatment is required, and the process control is easy.

The higher the content of the water-soluble resin (c), the easier the label is to peel off during high temperature water treatment, but the higher the content of water-soluble resin (c), the lower the adhesive strength between the label and the resin container tends to be, and the label may be peeled off even in a normal use condition such as during storage, during conveyance, or during use. In particular, the adhesive strength to a stretch blow molded body of polyethylene terephthalate (PET) or the like tends to be weaker than the adhesive strength to a direct blow molded body of polypropylene or the like.

In contrast, in the present invention, by controlling the amount of the water-soluble resin (c) blended to a specific mass ratio based on the heat sealing resin (a), sufficient adhesive strength to a resin container of not only an olefin-based resin to be direct blow molded but also an ester-based resin to be stretch blow molded, or the like can be obtained. Therefore, even if the water-soluble resin (c) is blended in the heat sealing layer (A), it is possible to provide a laminated body that is difficult to peel off in a normal use condition and that is easy to peel off during high temperature water treatment.

The laminated body of the present invention preferably has another heat sealing layer (B) between the substrate layer and the heat sealing layer (A). The heat sealing layer (B) can reinforce the heat sealing properties of the laminated body, and facilitates adjustment to further enhance the adhesive strength to an adherend such as a resin container.

The laminated body of the present invention can be preferably used as a label for a resin container that is often recycled, and an adherend made of a resin other than a resin container can be heat-sealed with the laminated body. Even in this case, the label can be peeled off from the adherend by high temperature water treatment.

FIG. 1 shows an example of the laminated body of the present invention.

A laminated body 10 illustrated in FIG. 1 has a substrate layer 1 and two heat sealing layers 21 and 22. The heat sealing layer 21 is an example of the heat sealing layer (A), and the heat sealing layer 22 is an example of the heat sealing layer (B). A printed layer 5 can be provided by printing on the surface of the substrate layer 1 opposite to the heat sealing layer 21.

Hereinafter, each layer will be described, focusing on an example in which the laminated body of the present invention is used as a label for a resin container, but as will be described later, the laminated body of the present invention can also be used for various uses other than a label.

(Heat Sealing Layer (A))

The heat sealing layer (A) is disposed on the outermost surface of the laminated body of the present invention and imparts heat sealing properties to the laminated body. As described above, the heat sealing layer (A) contains a heat sealing resin (a) and a water-soluble resin (c).

<Heat Sealing Resin (a)>

When the laminated body of the present invention is adhered to a resin container, the heat sealing resin (a) is melted, for example, by the heat during in-mold molding to enhance the adhesive strength of the laminated body. As the heat sealing resin (a), one or two or more can be selected from thermoplastic resins having a low melting point.

The melting point of the heat sealing resin (a) is preferably 50° C. or more, more preferably 60° C. or more, further preferably 70° C. or more, and particularly preferably 80° C. or more. This makes it difficult for laminated bodies to block each other. On the other hand, the melting point of the heat sealing resin (a) is preferably lower than the melting point of the thermoplastic resin used for the substrate layer, which will be described later. Specifically, the melting point of the heat sealing resin (a) is preferably 115° C. or less, more preferably 110° C. or less, further preferably 100° C. or less, and particularly preferably 95° C. or less. Thereby, the heat sealing resin (a) is easily melted, for example during in-mold molding, and the adhesive strength is easily enhanced. When two or more heat sealing resins (a) are used in combination, at least one thereof preferably has a melting point in the above range, and all thereof more preferably each have a melting point in the above range.

The melting point can be measured by a differential scanning calorimeter (DSC: differential scanning calorimeter).

Among heat sealing resins (a) as above, an olefin-based resin is preferable because it is excellent in moldability and processability, low cost, transparence, ease of control of flexibility, heat resistance, or chemical resistance.

Examples of the olefin-based resin suitable as the heat sealing resin (a) include a homopolymer and a copolymer of an olefin, and a copolymer formed from an olefin and another comonomer. Examples of the olefin include ethylene and propylene. Among these, ethylene is preferable because it is easy to obtain an appropriate crystallinity and it is easy to adjust the heat sealability. That is, the heat sealing resin (a) is preferably an ethylene-based resin that is an ethylene homopolymer or copolymer.

When the ethylene-based resin is a copolymer, the proportion of the structural unit derived from ethylene in the copolymer is preferably 80 mol % or more, more preferably 95 mol % or more, and further preferably 97 mol % or more, from the viewpoint of enhancing the adhesiveness at a low temperature. The proportion thereof is less than 100 mol %. On the other hand, from the viewpoint of suppressing blocking, the proportion of the structural unit derived from a monomer copolymerizable with ethylene in the ethylene-based resin is preferably 5 mol % or less and more preferably 3 mol % or less. The proportion thereof exceeds 0 mol %.

When the heat sealing resin (a) is polyethylene, for example, a low density or medium density polyethylene having a density of 0.900 to 0.940 g/cm$^3$, and a linear low density polyethylene having a density of 0.880 to 0.940 g/cm$^3$ are preferable. Among these, a low density, medium density, or linear low density polyethylene having a crystallinity of 10 to 60% as measured by an X-ray method and a melt flow rate (190° C., load of 2.16 kg) of 3 to 40 g/10 min is preferable.

In addition, from the viewpoint of improving the adhesive strength to a resin container, a copolymer formed from ethylene and another comonomer is preferably used as the heat sealing resin (a).

Examples of the another comonomer used with ethylene include vinyl acetate, (meth)acrylic acid, alkyl (meth)acrylate, and glycidyl (meth)acrylate. Acrylic acid or methacrylic acid may be a salt of a metal such as Zn, Al, Li, K, or Na.

Of these, vinyl acetate, glycidyl methacrylate, or methacrylic acid is preferable because it exhibits adhesive strength to a resin container made of an ester-based resin, particularly heat sealing properties even at a low temperature. These comonomers may be used singly or in combinations of two or more. That is, the heat sealing resin (a) that is an ethylene copolymer is preferably an ethylene-methacrylic acid copolymer, an ethylene-vinyl acetate copolymer, an ethylene-glycidyl methacrylate copolymer, or an ethylene-glycidyl methacrylate-vinyl acetate copolymer, and particularly preferably an ethylene-methacrylic acid copolymer.

<Water-Soluble Resin (c)>

Examples of the water-soluble resin (c) used in the heat sealing layer (A) include an acrylic resin, an acrylic silicone resin, a vinyl resin, a phenol resin, a urethane resin, a melamine resin, and a ketone resin. These may be modified with a further resin component. These can be used singly or in combinations of two or more. In addition, a crosslinking agent may be added to the water-soluble resin (c).

From the viewpoint of enhancing the peelability of the label by high temperature water treatment, the heat sealing layer (A) in the present invention preferably contains, among the water-soluble resins (c) above, a (meth)acrylic acid-based copolymer having a cationic group. If the heat sealing resin (a) is water-soluble, the heat sealing layer (A) can be formed by preparing a coating liquid using an aqueous solvent and applying the coating liquid, and the process control is easy.

<<(Meth)Acrylic Acid-Based Copolymer Having a Cationic Group>>

Among the (meth)acrylic acid copolymers having a cationic group, an amino group-containing (meth)acrylic acid copolymer is preferable from the viewpoint of suppressing a decrease in the adhesiveness of the heat sealing layer (A).

As used herein, the cationic group refers to a group that is positively charged when dissolved in water. Examples of the cationic group include (α) a group that can form a salt by binding to an anion, or (β) a group that can form a cation by binding to a proton in the presence of an acid (for example, acetic acid) and bind to an acid anion. Examples of the group (α) include an ammonium base and a phosphonium base. In addition, examples of the group (β) include a nitrogen compound group such as an amino group.

The amino group is a group represented by the following formula (1), and R$^1$ and R$^2$ can each independently be a hydrogen atom, an alkyl group having 1 to 3 carbon atoms, or an alkenyl group having 1 to 3 carbon atoms. The cationic group constituting an ammonium base is a group represented by the following formula (2), and R$^3$ to R$^5$ can each independently be a hydrogen atom, an alkyl group having 1 to 3 carbon atoms, or an alkenyl group having 1 to 3 carbon atoms. Hereinafter, the (meth)acrylic acid-based copolymer having a group represented by formula (1) or formula (2) is collectively referred to as an "amino group-containing (meth)acrylic acid-based copolymer."

  (1)

  (2)

From the viewpoint of improving adhesiveness, the amino group-containing (meth)acrylic acid-based copolymer preferably has a group represented by formula (2), and among others, the group is more preferably a cationic group constituting a tertiary ammonium base wherein R$^3$ is a hydrogen atom, R$^4$ and R$^5$ are each an alkyl group having 1 to 3 carbon atoms or an alkenyl group having 1 to 3 carbon atoms. The structure of the "(meth)acrylic acid-based copolymer" moiety in the "(meth)acrylic acid-based copolymer having a cationic group" contained in the heat sealing layer (A) may be the same as or different from that of the heat sealing resin (α).

<Mass Ratio of Heat Sealing Resin (α) to Water-Soluble Resin (c)>

The mass ratio (a:c) of the heat sealing resin (α) to the water-soluble resin (c) in the heat sealing layer (A) is 70:30 to 45:55. If the mass ratio is within this range, even when the water-soluble resin (c) is blended into the heat sealing layer (A), sufficient adhesive strength to a resin container can be obtained. Therefore, it is possible to adjust the adhesive strength of the laminated body such that it is difficult to peel off from a resin container in a normal use condition, and on the other hand is easy to peel off from the resin container when subjected to high temperature water treatment during the recycling thereof. The mass ratio (a:c) of the heat sealing resin (α) to the water-soluble resin (c) is more preferably 65:35 to 45:55.

<Tackifier>

The heat sealing layer (A) can contain a tackifier. By containing a tackifier, not only high adhesive strength to a molded body of polyethylene, polypropylene, or the like to be direct blow molded but also high adhesive strength to a molded body of polyethylene terephthalate, polyester, or the like to be stretch blow molded are easily obtained.

Examples of the tackifier include a hydrogenated petroleum resin, an aromatic hydrocarbon resin, and an aliphatic hydrocarbon resin. Examples of the hydrogenated petroleum resin include a partially hydrogenated petroleum resin. Examples of the aromatic hydrocarbon resin include a terpene-based resin, a rosin-based resin, and a styrene-based resin. The rosin-based tackifier is preferable from the viewpoint of improving the adhesive strength, particularly the adhesive strength to a molded body of polyester.

The softening point of the tackifier is preferably 85° C. or more, more preferably 90° C. or more, and further preferably 95° C. or more. The softening point thereof is preferably 110° C. or less and more preferably 105° C. or less. When the softening point is equal to or more than the above lower limit value, the development of tackiness of the resin remelted during the high temperature water treatment is suppressed, and it is easy to suppress the decrease in recyclability associated therewith. In addition, when the softening point is equal to or less than the above upper limit value, sufficient adhesive strength is easily obtained with a small amount of heat.

<<Another Additive>>

The heat sealing layer (A) can include a known additive as long as the heat sealing properties are not greatly impaired. Examples of the additive include a wax and an anti-blocking agent.

Examples of the wax include paraffin wax, microcrystalline wax, carnauba wax, and Fischer-Tropsch wax. The weight average molecular weight Mw of the wax is, for example, 5000 or less. Examples of the anti-blocking agent include an inorganic powder of silica, talc, zeolite, or the like.

The content of such additives in the heat sealing layer (A) is usually 0.01 to 5% by mass independently for each type of additive.

(Heat Sealing Layer (B))

The heat sealing layer (B) further imparts heat sealing properties to the laminated body. Not only the heat sealing properties due to the heat sealing layer (A) but also the heat sealing properties due to the heat sealing layer (B) are added, and thus the adhesion strength of the laminated body to the resin container can be further enhanced.

<Heat Sealing Resin (b)>

Examples of the heat sealing resin (b) include the same resins as listed in the section <Heat sealing resin (a)> in the "Heat sealing layer (A)."

Ones preferable as the heat sealing resin (b) are also the same as described above, and the heat sealing resin (b) included in the heat sealing layer (B) is particularly preferably polyethylene in that a burn mark, that is, a black burned substance generated on the surface of a laminated body during the production of the laminated body is unlikely to occur. Specifically, a low density or medium density polyethylene having a density of 0.900 to 0.940 g/cm$^3$ and a linear low density polyethylene having a density of 0.880 to 0.940 g/cm$^3$ are preferable, and among these, a polyethylene such as a low density, medium density, or linear low density polyethylene having a crystallinity of 10 to 60% as measured by an X-ray method and a melt flow rate (190° C., load of 2.16 kg) of 3 to 40 g/10 min is preferable.

The heat sealing resin (b) in the heat sealing layer (B) may be the same as or different from the heat sealing resin (a) in the heat sealing layer (A).

The heat sealing layer (B) may be a film formed from the heat sealing resin (b), or may be a film formed from the heat sealing resin (b) including the following additive.

<Additive>

As can the heat sealing layer (A) described above, the heat sealing layer (B) can include a known additive as long as the advantageous effect of the invention is not impaired. Examples of the additive include a wax and an anti-blocking agent. The content of such additives in the heat sealing layer (B) is usually 0.01 to 5% by mass independently for each type of additive.

(Substrate Layer)

The substrate layer can impart mechanical strength to a laminated body. Thereby, when printing on a laminated body or when inserting a laminated body into a mold, sufficient elasticity can be obtained, and excellent handleability can be obtained.

<Thermoplastic Resin>

The substrate layer contains a thermoplastic resin. Examples of the thermoplastic resin include an olefin-based resin, an ester-based resin, an amide-based resin, a polyvinyl chloride resin, a polystyrene resin, and a polycarbonate resin. From the viewpoint of mechanical strength, the substrate layer preferably includes an olefin resin or an ester resin and more preferably includes an olefin resin, as the thermoplastic resin.

Examples of the olefin-based resin include a propylene-based resin and an ethylene-based resin. From the viewpoint of moldability and mechanical strength of the laminated body, a propylene-based resin is preferable.

The propylene-based resin is not particularly limited as long as propylene is used as the main monomer. Examples thereof include an isotactic polymer or a syndiotactic polymer obtained by homopolymerizing propylene. In addition, a propylene-α-olefin copolymer, which is a copolymer of propylene as the main component and an α-olefin such as ethylene, 1-butene, 1-pentene, 4-methyl-1-pentene, 1-hexene, 1-heptene, or 1-octene, or the like can also be used. Here, the "main component" refers to a monomer that constitutes the copolymer at 50% by mass or more. The copolymer may be a copolymer consisting of two monomer components or a multicomponent copolymer consisting of three or more monomers, and may be a random copolymer or a block copolymer. In addition, a propylene homopolymer and a propylene copolymer may be used in combination. Among these, the propylene homopolymer is preferable because it is easy to handle as the main component for the substrate layer.

Examples of the ethylene-based resin include a high density polymer having a density of about 0.940 to 0.965 g/cm$^3$, a medium density polymer having a density of about 0.920 to 0.940 g/cm$^3$, a linear low density polyethylene having a density of about 0.900 to 0.920 g/cm$^3$, a copolymer composed mainly of ethylene or the like and obtained by copolymerization with an α-olefin such as propylene, butene, hexene, heptene, octene, or 4-methylpentene-1, an ethylene-alkyl (meth)acrylate copolymer, an ethylene-(meth)acrylic acid copolymer or a metal salt (the metal is zinc, aluminum, lithium, sodium, potassium, or the like) thereof, and an ethylene-cyclic olefin copolymer.

Examples of the ester-based resin include a polyethylene terephthalate, a polybutylene terephthalate, and polyethylene naphthalate.

In addition, examples of the amide-based resin include nylon-6, nylon-6,6, nylon-6,10, and nylon-6,12.

The content of the thermoplastic resin in the substrate layer is preferably 50% by mass or more and more preferably 70% by mass or more. When the content is 50% by mass or more, the mechanical strength of the substrate layer is easily improved. On the other hand, there is no particular upper limit for the content of the thermoplastic resin, and the upper limit may be 100% by mass. The substrate layer may contain a filler described later, an additive, or the like as long as it does not affect the strength or the moldability of the laminated body, and in this case, the content of the thermoplastic resin may be less than 100% by mass.

<Filler>

The substrate layer can contain a filler. By containing a filler, a pore with the filler as a core is easily formed inside the substrate layer, and the whiteness or the opacity can be enhanced.

Examples of the filler that can be used for the substrate layer include an inorganic filler and an organic filler.

Examples of the inorganic filler include an inorganic particle of heavy calcium carbonate, light calcium carbonate, calcined clay, silica, diatomaceous earth, white clay, talc, a titanium oxide such as rutile type titanium dioxide, barium sulfate, aluminum sulfate, zinc oxide, magnesium oxide, mica, sericite, bentonite, sepiolite, vermiculite, dolomite, wollastonite, glass fiber, or the like. Among these, heavy calcium carbonate, clay, or diatomaceous earth is preferable because it has good formability of a pore and is inexpensive. The surface of the inorganic filler may be surface-treated using a surface treatment agent such as fatty acid for the purpose of improving the dispersibility or the like.

Examples of the organic filler include one made of a resin incompatible with the thermoplastic resin contained in the substrate layer, and for example, when the thermoplastic resin is an olefin-based resin, examples of the organic filler include an organic particle of polyethylene terephthalate, polyethylene naphthalate, polybutylene terephthalate, polyamide, polycarbonate, polystyrene, a cyclic olefin homopolymer, an ethylene-cyclic olefin copolymer, polyethylene sulfide, polyimide, polymethacrylate, polyether ether ketone, polyphenylene sulfide, a melamine resin, or the like, which is incompatible with the olefin-based resin.

The above inorganic fillers or organic fillers can be used singly or in combinations of two or more.

From the viewpoint of enhancing the whiteness or the opacity of the substrate layer, the content of the filler in the substrate layer is preferably 10% by mass or more and more preferably 15% by mass or more. In addition, from the viewpoint of enhancing the uniformity of molding of the substrate layer, the content of the filler in the substrate layer is preferably 70% by mass or less, more preferably 60% by mass or less, and further preferably 50% by mass or less. On the other hand, from the viewpoint of enhancing the transparency of the substrate layer, the content of the filler in the substrate layer may be less than 10% by mass or 0% by mass.

The average particle size of the inorganic filler or the organic filler is preferably 0.01 µm or more, more preferably 0.05 µm or more, and further preferably 0.1 µm or more, from the viewpoint of easiness of forming a pore. From the viewpoint of imparting mechanical strength such as tear resistance to the laminated body, the average particle size of the inorganic filler or the organic filler is preferably 15 µm or less, more preferably 5 µm or less, and further preferably 2 µm or less.

The average particle size of the inorganic filler is the volume average particle size (50% cumulative particle size) D50, which corresponds to 50% of the cumulative volume as measured using a particle measurement apparatus, for example, a laser diffraction particle size distribution analyzer (Microtrac, manufactured by Nikkiso Co., Ltd.). In addition, the average particle size of the organic filler is the average dispersed particle size when dispersed in a thermoplastic resin by melt-kneading and dispersion. The average dispersed particle size can be determined as an average value obtained by observing a cut surface of a thermoplastic resin film containing an organic filler using an electron microscope and measuring and averaging the maximum sizes of at least 10 particles.

<Porosity>

When the substrate layer has a pore inside, the porosity, which represents the proportion of a pore in a layer, is preferably 10% or more, more preferably 20% or more, and further preferably 30% or more from the viewpoint of obtaining opaqueness. From the viewpoint of maintaining the mechanical strength, the porosity is preferably 70% or less, more preferably 55% or less, and further preferably 40% or less. On the other hand, from the viewpoint of enhancing the transparency of the substrate layer, the porosity may be less than 10% or 0%.

The porosity can be determined from the proportion of the area occupied by the pore in a certain region of a cross section of a sample observed using an electron microscope.

Usually, the higher the filler content, the higher the porosity, and the higher the whiteness or the opacity of the substrate layer. The filler content or the porosity can be selected according to the transparence, whiteness, or the like required for the laminated body.

<Another Additive>

The substrate layer can contain a component such as an antioxidant such as a sterically hindered phenol-based one, a phosphorus-based one, an amine-based one, or a sulfur-based one; a light stabilizer such as a sterically hindered amine-based one, a benzotriazole-based one, or a benzophenone-based one; a dispersant, or an antistatic agent, depending on the required physical property. When the substrate layer contains such components, the content of each component is preferably 0.001 to 1% by mass based on the total mass of the components constituting the substrate layer.

<Specific Gravity>

The specific gravity of the substrate layer is preferably 1.0 or less. Thereby, the laminated body peeled off from a molded body when immersed in water in high temperature water treatment easily rises. The specific gravity of the resin of a molded body generally exceeds 1.0, and thus the molded body and the laminated body are easily separated from each other, and the label is easily removed.

The surface of the substrate layer opposite to the surface facing the heat sealing layer may be surface-treated from the viewpoint of enhancing the close adhesion to the printed layer.

(Printed Layer)

The printed layer is provided by printing a character, a graphic, or the like on the surface of the substrate layer opposite to the surface facing the heat sealing layer. The printed layer is a layer formed by a printing ink component.

From the viewpoint of enhancing the close adhesion to ink, a print-receiving layer may be provided on a surface of the substrate layer, and a printed layer may be laminated on this print-receiving layer. The print-receiving layer can be formed, for example, by applying a coating agent to a surface of the substrate layer.

(Properties of Laminated Body)

<Thickness>

The thickness of the heat sealing layer (A) can be expressed as the mass per unit area of the heat sealing layer (A). The thickness of the heat sealing layer (A) is preferably 0.01 g/m$^2$ or more and more preferably 0.03 g/m$^2$ or more from the viewpoint of recyclability. In addition, the thickness of the heat sealing layer (A) is preferably 5 g/m$^2$ or less, more preferably 1 g/m$^2$ or less, and further preferably 0.5 g/m$^2$ or less from the viewpoint of adhesive strength.

If the above mass range is converted into a thickness, the thickness of the heat sealing layer (A) is preferably 0.01 µm or more and more preferably 0.03 µm or more from the viewpoint of recyclability. In addition, the thickness of the heat sealing layer (A) is preferably 5 µm or less, more preferably 1 µm or less, and further preferably 0.5 µm or less from the viewpoint of adhesive strength.

The thickness of the heat sealing layer (B) is preferably 1 µm or more and more preferably 2 µm or more from the viewpoint of obtaining good adhesiveness. From the viewpoint of suppressing cohesion failure inside the heat sealing layer (B), the thickness of the heat sealing layer (B) is preferably 35 µm or less, more preferably 25 µm or less, further preferably 15 µm or less, more further preferably 5 µm or less, and particularly preferably 3 µm or less.

The thicknesses of the heat sealing layers (A) and (B) can be measured by observation of a cross section using a scanning electron microscope as described in Examples.

From the viewpoint of layer strength, the thickness of the substrate layer is preferably 20 μm or more and more preferably 40 μm or more. From the viewpoint of reducing the weight of the laminated body, the thickness of the substrate layer is preferably 200 μm or less and more preferably 150 μm or less.

(Method for Producing Laminated Body)

The method for producing the laminated body of the present invention is not particularly limited. For example, the laminated body of the present invention can be produced by forming a film of each layer and laminating the same.

<Film Forming>

Examples of the method for forming a film of each layer include a film forming method such as extrusion (casting) using a T die, inflation molding using an O die, and calendering using a calender roll.

Examples of the method for laminating each film include a coextrusion method, an extrusion lamination method, and a coating method, and these can be combined.

In the coextrusion method, a resin composition for each layer is supplied to a multilayer die, and these are laminated inside the multilayer die and extruded.

According to the coextrusion method, laminating is carried out in parallel with film forming.

In the extrusion lamination method, on a one-layer film previously formed, a molten resin composition for another layer is extruded to form a film, this film is laminated thereon, and the resulting laminate is nipped using rolls while being cooled. According to the extrusion lamination method, film forming and laminating are carried out in separate steps.

In the coating method, onto a one-layer film previously formed, a solution, emulsion, or dispersion of a resin composition for another layer is applied and dried to form and laminate another film.

<Stretching>

Each layer may be an unstretched film or a stretched film. In addition, each layer may be stretched individually before laminating, or may be stretched together after laminating. After the unstretched layer and the stretched layer are laminated, these may be stretched again.

Examples of the stretching method include a longitudinal stretching method using difference in peripheral speed of a roll group, a transverse stretching method using a tenter oven, a sequential biaxial stretching method combining these, a rolling method, a simultaneous biaxial stretching method using a combination of a tenter oven and a pantograph, and a simultaneous biaxial stretching method using a combination of a tenter oven and a linear motor. In addition, a simultaneous biaxial stretching (inflation molding) method in which a molten resin is extruded into a tube shape using a circular die connected to a screw type extruder and then air is blown into the molten resin extruded, or the like can also be used.

When the thermoplastic resin used for each layer is an amorphous resin, the stretching temperature at the time of carrying out stretching is preferably in the range of the glass transition point of the thermoplastic resin or higher. In addition, when the thermoplastic resin is a crystalline resin, the stretching temperature is preferably within the range of the glass transition point of an amorphous portion of the thermoplastic resin or higher and the melting point of a crystalline portion of the thermoplastic resin or lower, and specifically, a temperature 2 to 60° C. lower than the melting point of the thermoplastic resin is preferable.

The stretching speed is not particularly limited, and is preferably within the range of 20 to 350 m/min from the viewpoint of stable stretching and molding.

In addition, the stretch ratio can also be appropriately determined in consideration of the properties of the thermoplastic resin used and the like. For example, when a thermoplastic resin film including a homopolymer of propylene or a copolymer thereof is stretched in one direction, the stretch ratio is usually about 1.2 times or more and preferably 2 times or more, and usually 12 times or less and preferably 10 times or less. In addition, the stretch ratio in the case of biaxial stretching, which is the area stretch ratio, is usually 1.5 times or more and preferably 10 times or more, and usually 60 times or less and preferably 50 times or less.

If the stretch ratio is within the above range, the film is unlikely to break and tends to be able to be stably stretched and molded. In addition, when the substrate layer is white or opaque, the target porosity is obtained, and the opacity is easily improved.

<Surface Treatment>

In order to enhance the close adhesion to an adjacent layer, the surface of each layer is preferably activated by a surface treatment.

Examples of the surface treatment include corona discharge treatment, frame treatment, plasma treatment, glow discharge treatment, and ozone treatment, and these treatments can be combined. Among these, corona discharge treatment or frame treatment is preferable, and corona discharge treatment is more preferable.

The amount of discharge when the corona discharge treatment is carried out is preferably 600 $J/m^2$ (10 W·min/$m^2$) or more and more preferably 1,200 $J/m^2$ (20 W·min/$m^2$) or more. In addition, the amount of discharge is preferably 12,000 $J/m^2$ (200 W·min/$m^2$) or less and more preferably 10,800 $J/m^2$ (180 W·min/$m^2$) or less. The amount of discharge when the frame treatment is carried out is preferably 8,000 $J/m^2$ or more and more preferably 20,000 $J/m^2$ or more, and the amount of discharge is preferably 200,000 $J/m^2$ or less and more preferably 100,000 $J/m^2$ or less.

<Formation of Printed Layer>

The printed layer can be formed by printing on the surface of the substrate layer opposite to the surface facing the heat sealing layer (A). For example, when the laminated body of the present invention is used as a label, examples of printed information include a commercial product name, a logo, a manufacturer, a sales company name, a usage method, and a barcode, and in addition, when the laminated body of the present invention is used as a decorative material described later, examples thereof include various colored patterns and images.

Examples of the printing method are not particularly limited and include gravure printing, offset printing, flexographic printing, sticker printing, and screen printing.

<Processing>

By cutting or punching the laminated body obtained by the above steps, the laminated body can be processed into a required shape and dimension. The cutting or punching can be carried out before printing, and is preferably carried out after printing from the viewpoint of ease of work.

(Use of Laminated Body)

The laminated body of the present invention can be used in the use of decorating a molded body (adherend) by vacuum forming, pressure forming, vacuum pressure forming (TOM molding), insert molding, or the like, or for a sealant material, a packaging material, a label, or the like, taking advantage of the heat sealing properties thereof. Among these, the laminated body of the present invention is preferably used as a heat-sensitive label from the viewpoint of taking advantage of properties of the present invention. Even when the laminated body of the present invention is used in a use other than a label use, such as the above decorative use, the laminated body can be peeled off from the adherend by high temperature water treatment as in the case where the laminated body is used as a label for a resin container.

[Heat-Sensitive Label]

The heat-sensitive label of the present invention includes the laminated body of the present invention described above. The heat-sensitive label of the present invention can be adhered to an adherend made of a resin via the heat sealing layer (A) melted by heating.

[In-Mold Label]

The in-mold label of the present invention consists of the heat-sensitive label of the present invention described above. The in-mold label of the present invention can provide good adhesive strength not only to a container formed from an olefin-based resin to be direct blow molded but also a container formed from an ester-based resin to be stretch blow molded. Therefore, the in-mold label of the present invention can be preferably used even for an ester-based resin container, for which it is usually difficult to obtain adhesive strength to a label. The in-mold label of the present invention can be adhered not only to a resin container but also to a molded article other than a container molded using a mold.

[Labeled Container]

The labeled container of the present invention comprises the in-mold label of the present invention adhered to the outer surface of a resin container via the heat sealing layer (A). There is no particular limitation on the method for adhering the heat-sensitive label of the present invention to a resin container as long as the heat-sensitive label is used for heat sealing, and by using the heat-sensitive label as an in-mold label and adhering the same by the heat during in-mold molding of a resin container, the adhesive strength in a normal use condition can be enhanced, which is preferable.

When the in-mold label of the present invention is used for in-mold molding, for example, the label is disposed on the inner surface of the lower female mold, which is a differential pressure molding mold, such that the printed surface of the label is in contact with the inner surface of the mold, and then fixed onto the inner wall of the mold by suction. Next, the melt of a resin sheet, which is a molded body material, is guided above the lower female mold, and is subjected to differential pressure molding by a conventional method to produce a labeled molded body in which the label is integrally adhered to the outer wall of the molded body. Both vacuum forming and compressed air forming can be adopted for the differential pressure forming, and in general, the differential pressure forming in which the both are used in combination and a plug assist is used is preferable.

In addition, the in-mold label of the present invention can be suitably used for direct blow molding in which a molten resin parison is pressed against the inner wall of a mold by compressed air, stretch blow molding using a preform, or injection molding in which a molten resin is injected into a mold using an injection apparatus and cooled and solidified. Among these, the heat-sensitive label of the present invention is suitable for direct blow molding or injection molding.

In these molding methods, a resin container is molded in a mold to which the label is fixed, and thus a molded body having a good appearance which is decorated with the label and in which there is no deformation of the label, the adhesive strength between the molded body and the label is strong, and there is no blister can be obtained.

(Resin Container)

The material of a resin container for which the in-mold label of the present invention can be used is not particularly limited, and for example, the in-mold label can be used for a resin container formed from an olefin-based resin such as polyethylene or polypropylene, or an ester-based resin such as polyethylene terephthalate (PET).

The color of the resin container may be transparent, or may be a natural color including no coloring material such as a pigment or a dye, or may be an opaque color due to a coloring material or coloring.

Examples of the resin container include a bottle and a box. The cross-sectional shape of the body of the resin container may be a perfect circle, an ellipse, or a rectangle. When the cross-sectional shape of the body is a rectangle, the corners preferably have a curvature. From the viewpoint of strength, the cross section of the body is preferably a perfect circle or an ellipse close to a perfect circle, and more preferably a perfect circle.

EXAMPLES

Hereinafter, the present invention will be described further specifically with reference to Examples, but the present invention is not limited to the following Examples. A description of "parts," "%," or the like in the Examples means a description on a mass basis unless otherwise specified.

Table 1 shows a list of materials used in the production of the heat-sensitive labels of Examples and Comparative Examples.

TABLE 1

| | Type | Symbol | Description |
| --- | --- | --- | --- |
| Substrate layer | Thermoplastic resin | MA | Propylene homopolymer (trade name: NOVATEC PP MA4, manufactured by Japan Polypropylene Corporation, melting point (JIS-K7121): 167° C.) |
| Heat sealing layer (B) | Heat sealing resin (b) | KS | Metallocene-based low density polyethylene (trade name: KERNEL KS571, manufactured by Japan Polyethylene Corporation, melting point: 100° C., density (ASTMD-1505) 0.907 g/cm$^3$, MFR (ASTMD-1238, 190° C., load of 2.16 kg): 12 g/10 min) |

TABLE 1-continued

| | Type | Symbol | Description |
|---|---|---|---|
| Heat sealing layer (A) | Water-soluble resin (c) | Ac | Methacrylic acid-based copolymer (Mw: 40,000) |
| | Heat sealing resin (a) | EMAA | Ethylene-methacrylic acid copolymer (trade name: NUCREL N035C, manufactured by Dow-Mitsui Polychemicals Co., Ltd., melting point: 86° C.) |

(Preparation Example 1: Preparation of Water-Soluble Resin (c) (Ac))

40 kg of isopropanol (manufactured by Tokuyama Corporation, product name: TOKUSO IPA) was placed in a reactor having an internal volume of 150 L equipped with a reflux condenser, a nitrogen introduction tube, a stirrer, a thermometer, a dropping funnel, and a heating jacket. While stirring this, 12.6 kg of N, N-dimethylaminoethyl methacrylate (manufactured by Sanyo Chemical Industries, Ltd., product name: Methacrylate DMA), 12.6 kg of butyl methacrylate (manufactured by Mitsubishi Rayon Co., Ltd., product name: Acryester B), and 2.8 kg of a higher alcohol methacrylate (manufactured by Mitsubishi Rayon Co., Ltd., product name: Acryester SL, a mixture of lauryl methacrylate and tridecyl methacrylate) were introduced into the reactor. Next, nitrogen purge inside the system was carried out, the temperature in the reactor was raised to 80° C., and then 0.3 kg of 2,2'-azobisisobutyronitrile (manufactured by Wako Pure Chemical Industries, Ltd., product name: V-60 (AIBN)) as a polymerization initiator was introduced into the reactor.

The copolymerization reaction was carried out by continuing stirring for 4 hours while keeping the temperature in the reactor at 80° C. After cooling to room temperature, 4.3 kg of glacial acetic acid (manufactured by Wako Pure Chemical Industries, Ltd.) was introduced into the reactor to neutralize the resulting copolymer. Next, while introducing 48.3 kg of ion exchanged water into the reactor, isopropanol was distilled off to replace the system with an aqueous system to obtain a viscous aqueous solution (solid concentration of 35% by mass) of a methacrylic acid-based copolymer having a tertiary amino group as a polar group in a side chain (Ac) (having no melting point, weight average molecular weight Mw: 40,000). The obtained methacrylic acid-based copolymer was bound to a proton in the aqueous solution and bound to an acetate ion as a cation, and thus it was confirmed that the polar group was a cationic group.

Example 1

As a material for the substrate layer, 100 parts by mass of a propylene homopolymer (MA) (trade name: NOVATEC PP MA4, manufactured by Japan Polypropylene Corporation, melting point (JIS-K7121): 167° C.) was provided. This was melt-kneaded in an extruder heated to 210° C. and supplied to a two-layer coextrusion die.

In addition, as the heat sealing resin (b), which is a material for the heat sealing layer (B), 100 parts by mass of a metallocene-based low density polyethylene (KS), which is a linear low density polyethylene, (trade name: KERNEL KS571, manufactured by Japan Polyethylene Corporation, MFR: 12 g/10 min, melting point: 100° C., density: 0.907 g/cm$^3$) was provided. This was melted using an extruder heated to 210° C. and supplied to the same two-layer coextrusion die as for the substrate layer.

The material for the substrate layer and the material for the heat sealing layer (B) were laminated in the two-layer coextrusion die and extruded from the die as a sheet having a two-layer structure. This was cooled by a cooling apparatus to obtain an unstretched sheet having a two-layer structure.

The obtained unstretched sheet was heated to 150° C. and stretched 5 times in the longitudinal direction by utilizing the difference in peripheral speed of a plurality of roll groups. The sheet was cooled to 60° C. and then heated to 150° C. again and stretched 8 times in the transverse direction using a tenter. Next, the sheet was annealed at 160° C. and cooled to 60° C. to obtain a transparent biaxially stretched film having a two-layer structure.

After slitting an edge portion of the biaxially stretched film, the film was guided to a corona discharge treatment apparatus, and both the surfaces on the substrate layer side and the surface on the heat sealing layer (B) side were subjected to corona discharge treatment at 50 W/m$^2$.

The total thickness of the obtained biaxially stretched film was 70 μm. In addition, in the above film, the thickness of the substrate layer was 68 μm, and the thickness of the heat sealing layer (B) was 2 μm.

Next, the methacrylic acid-based copolymer (Ac) having a polar group obtained in Preparation Example 1 as the water-soluble resin (c), and an ethylene-methacrylic acid copolymer (EMAA) (trade name: NUCREL N035C, manufactured by Dow-Mitsui Polychemicals Co., Ltd., melting point: 86° C.) as the heat sealing resin (α) were diluted with ion exchanged water to prepare a coating liquid. The solid concentration of the coating liquid was adjusted to 10% by mass, and the mass ratio of the methacrylic acid-based copolymer (Ac) to the ethylene-methacrylic acid copolymer (EMAA) in the coating liquid was adjusted to 40:6. The prepared coating liquid was applied onto the surface of the biaxially stretched film on the heat sealing layer (B) side using a gravure coater. The applied coating liquid was dried in an oven at 80° C. to form a heat sealing layer (A) to obtain a three-layer laminated body as a heat-sensitive label of Example 1.

The thickness of the heat sealing layer (A) of the heat-sensitive label of Example 1 was 0.05 g/m$^2$ (0.05 μm). The content (parts by mass) of each of the methacrylic acid-based copolymer (Ac) and the ethylene-methacrylic acid copolymer (EMAA) in the heat sealing layer (A) is shown in Table 2.

Example 2 and Comparative Examples 1 to 3

Heat-sensitive labels of Example 2 and Comparative Example 1 to 3 were produced in the same manner as in Example 1 except that the composition of the heat sealing layer (A) in Example 1 was changed as shown in Table 2.

Comparative Example 4

A three-layer laminated body of substrate layer/heat sealing layer (B)/heat sealing layer (A) was produced in the same manner as in Example 1 except that the composition of the heat sealing layer (A) in Example 1 was changed as shown in Table 2. Next, EMAA dissolved in toluene was applied to the surface of the heat sealing layer (A) using a gravure coater. The applied EMAA was dried in an oven at 80° C. to form a heat sealing layer (Z) having an EMAA content (parts by mass) value as shown in Table 2, to obtain a four-layer laminated body as a heat-sensitive label of Comparative Example 4.

Various physical properties of the above heat-sensitive labels were measured as follows.

<Thickness>

The thickness (total thickness) of the heat-sensitive label was measured using a constant pressure thickness gauge (product name: PG-01J, manufactured by TECLOCK Co., Ltd.) according to JIS K7130:1999. In addition, the thickness of each layer in the heat-sensitive label was determined as follows. A sample to be measured was cooled to a temperature of −60° C. or less using liquid nitrogen, and a razor blade (trade name: Proline Blade, manufactured by Schick Japan K.K.) was applied at a right angle to the sample placed on a glass plate to cut the sample to prepare a sample for cross-sectional observation. A cross section of the obtained sample was observed using a scanning electron microscope (product name: JSM-6490, manufactured by JEOL Ltd.), and a boundary line for each thermoplastic resin composition of the layers was discriminated from the appearance and the measured value of the total thickness of the heat-sensitive label was multiplied by the thickness ratio of each layer observed to determine the thickness of each layer.

(Evaluation)

Labeled containers were produced using the heat-sensitive labels of each Example and Comparative Example as follows, and the adhesive strength and the recyclability of each heat-sensitive label were evaluated.

<Production of Labeled Containers>

The heat-sensitive label was cut into a sheet-like shape immediately after the preparation thereof and punched into a rectangle having a long side of 8 cm and a short side of 6 cm to prepare a sample for evaluation.

The sample was charged using an electrostatic charging apparatus, disposed inside a molding mold of a stretch blow molding machine (manufactured by NISSEI ASB Machine Co., Ltd., machine name: ASB-70DPH), and clamped. The disposition was carried out such that the substrate layer was in contact with the mold. The heat-sensitive label was disposed in the mold such that the long side of the label was parallel to the circumferential direction of the body of a resin container in the form of a quadratic prism. The mold was controlled such that the surface temperature on the cavity side was within the range of 20 to 45° C.

On the other hand, a preform of a polyethylene terephthalate resin was preheated to 100° C. This preform was guided to the mold and stretch blow molded for 1 second under a blow pressure of 5 to 40 kg/cm². After cooling to 50° C. in 15 seconds, the mold was opened to obtain a PET container with a heat-sensitive label having a square body having a height of 12 cm and a side length of about 7 cm.

<Adhesive Strength>

The obtained labeled PET container was stored for 2 days in an environment of a temperature of 23° C. and a relative humidity of 50%. Next, the label and the container main body at the portion of the labeled PET container where the label was provided were integrally cut off using a cutter, and a sample having a length of 12 cm with the circumferential direction of the container body as the longitudinal direction (the label-attached portion measuring 8 cm, the label-unattached portion measuring 4 cm) and a width of 1.5 cm (the label was attached to the entire width) was collected.

The label-attached portion of the obtained sample was carefully peeled off from the label-unattached portion thereof and peeled off by about 1 cm to form a grip margin. Next, the grip margin and a PET film (thickness of 50 μm) having a width of 1.5 cm were overlapped and adhered using an adhesive to form a grip margin portion on the label side to prepare a sample for measuring the adhesive strength.

A 180-degree peeling test of the container body and the label was carried out under a condition of a peeling speed of 300 mm/min using a tensile tester (manufactured by Shimadzu Corporation, model name: Autograph AGS-5kNJ) based on JIS K6854-2:1999. The average value of the peeling forces between peeling lengths of 25 to 75 mm was measured, and further, the value obtained by averaging the measured values at 6 points of the sample was taken as the adhesive strength. The unit of adhesive strength was gf/15 mm. An adhesive strength of 200 gf/15 mm or more can be considered to be a practical level.

<Recyclability>

100 8 mm×8 mm samples were cut out from the label-attached portion of the labeled PET container after storage thus obtained. The 100 samples obtained were immersed in boiled water at 80° C. for 15 minutes and stirred at a stirring speed of 1000 rpm, and then the samples were taken out. The recyclability was evaluated from the number of samples from which the label was peeled off as follows.

A: In 95 or more of the 100 samples, the label was peeled off (practical level)

B: In 90 or more and 94 or less of the 100 samples, the label was peeled off (practical level)

C: In 89 or less of the 100 samples, the label was peeled off, or in 90 or more of the 100 samples, the label was peeled off but the peeling was incomplete (impractical level)

Table 2 below shows the composition and evaluation results of each heat-sensitive label.

TABLE 2

| | Substrate layer Thermoplastic resin [parts by mass] | Heat sealing layer (B) Heat sealing resin (b) [parts by mass] | Heat sealing layer (A) | | Heat sealing layer (Z) Heat sealing resin (a) [parts by mass] | Adhesive strength [gf/15 mm] | Recyclability |
|---|---|---|---|---|---|---|---|
| | | | Heat sealing resin (a) [parts by mass] | Water-soluble resin (c) [parts by mass] | | | |
| Example 1 | 100 | 100 | 12 | 8 | — | 450 | A |
| Example 2 | 100 | 100 | 10 | 10 | — | 400 | A |
| Comparative Example 1 | 100 | 100 | 20 | 0 | — | 500 | C |
| Comparative Example 2 | 100 | 100 | 0 | 20 | — | 150 | A |

TABLE 2-continued

| | Substrate layer Thermoplastic resin [parts by mass] | Heat sealing layer (B) Heat sealing resin (b) [parts by mass] | Heat sealing layer (A) Heat sealing resin (a) [parts by mass] | Heat sealing layer (A) Water-soluble resin (c) [parts by mass] | Heat sealing layer (Z) Heat sealing resin (a) [parts by mass] | Adhesive strength [gf/15 mm] | Recyclability |
|---|---|---|---|---|---|---|---|
| Comparative Example 3 | 100 | 100 | 18 | 2 | — | 480 | C |
| Comparative Example 4 | 100 | 100 | 10 | 10 | 20 | 500 | C |

As is shown in Table 2, the heat-sensitive labels of Examples 1 and 2 can all achieve both sufficient adhesive strength and excellent recyclability. On the other hand, the heat-sensitive labels of Comparative Examples 1 and 3 had high adhesive strength, but had low recyclability and a small number of peeled labels. The heat-sensitive label of Comparative Example 2 had good recyclability, but had weak adhesive strength. The heat-sensitive label of Comparative Example 4 had high adhesive strength, but had incomplete peeling in the recyclability evaluation, and the label is peeled off at the heat sealing layer (A), leaving the heat sealing layer (Z) on the surface of the PET container.

The present application claims priority based on Japanese Patent Application No. 2021-138691 filed on Aug. 27, 2021, the disclosure of which is incorporated herein by reference in its entirety.

REFERENCE SIGNS LIST

10 . . . laminated body, 1 . . . substrate layer, 21 . . . heat sealing layer (A), 22 . . . heat sealing layer (B), and 5 . . . printed layer

The invention claimed is:

1. A laminated body comprising a substrate layer and a heat sealing layer (A), wherein
the heat sealing layer (A) is an outermost layer of the laminated body,
the heat sealing layer (A) comprises a heat sealing resin (a) and a water-soluble resin (c),
a mass ratio of the heat sealing resin (a) to the water-soluble resin (c) in the heat sealing layer (A) is 70:30 to 45:55, and
the water-soluble resin (c) contains a (meth)acrylic acid copolymer containing an amino group represented by the following formula (1) or an ammonium group represented by the following formula (2)

$$-NR^1R^2 \quad (1)$$

$$-N^+R^3R^4R^5 \quad (2)$$

where $R^1$ and $R^2$ are each independently a hydrogen atom, an alkyl group having 1 to 3 carbon atoms, or an alkenyl group having 1 to 3 carbon atoms; and $R^3$ to $R^5$ are each independently a hydrogen atom, an alkyl group having 1 to 3 carbon atoms, or an alkenyl group having 1 to 3 carbon atoms.

2. The laminated body according to claim 1, wherein the heat sealing resin (a) is an olefin-based resin having a melting point of 50 to 115° C.

3. The laminated body according to claim 1, wherein the laminated body comprises a heat sealing layer (B) between the substrate layer and the heat sealing layer (A).

4. The laminated body according to claim 3, wherein the heat sealing layer (B) comprises a heat sealing resin (b), and
the heat sealing resin (b) is an olefin-based resin having a melting point of 50 to 115° C.

5. The laminated body according to claim 1, wherein the laminated body comprises a printed layer on a surface of the substrate layer opposite to the heat sealing layer (A).

6. A heat-sensitive label comprising the laminated body according to claim 1.

7. An in-mold label comprising the heat-sensitive label according to claim 6.

8. A labeled container, comprising the in-mold label according to claim 7 adhered to an outer surface of a resin container via the heat sealing layer (A).

9. The labeled container according to claim 8, wherein the resin container comprises an ester-based resin.

* * * * *